April 14, 1964  F. V. LONG  3,129,394
COAXIAL MODE TRANSMISSION OF CARRIER CURRENTS
USING INSULATED BURIED PIPE AND
SURROUNDING EARTH
Filed March 17, 1958  2 Sheets-Sheet 1

Francis V. Long
INVENTOR.

BY J. Vincent Martin
Joe E. Edwards
M. Harvey Gray
ATTORNEYS

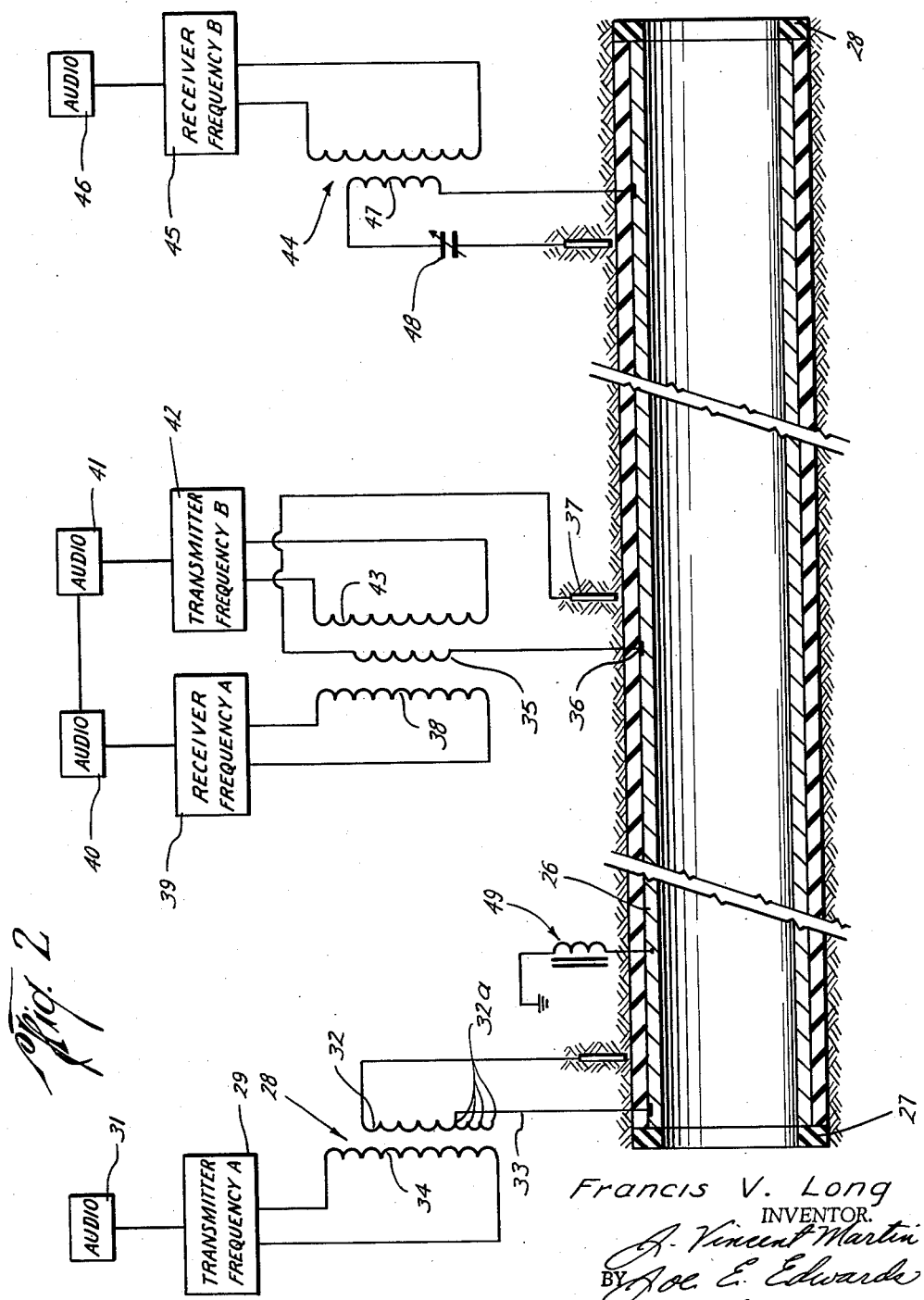

3,129,394
COAXIAL MODE TRANSMISSION OF CARRIER CURRENTS USING INSULATED BURIED PIPE AND SURROUNDING EARTH
Francis V. Long, Shreveport, La., assignor to Texas Eastern Transmission Corporation, Shreveport, La., a corporation of Delaware
Filed Mar. 17, 1958, Ser. No. 722,019
9 Claims. (Cl. 333—27)

This invention relates to a method and system of transmitting A.C. signals and more particularly to transmitting A.C. signals along a pipeline.

For many years there has been a need for a reliable method of transmitting supervisory control, telemetering, voice, data handling, or other intelligence along the routes of pipeline systems. Various methods are used including landlines, cables, microwave radio, etc., but all of these methods are costly and subject to outside interruptions and interference due to accidental breaks, storms, lightning and other causes. These methods have included burial of a wire or cable inside or alongside the pipeline as it is installed.

Experiments have been made seeking to use the metallic pipeline as a conductor, but due to the high capacitance to ground, the higher audio frequencies have been attenuated to a point whereby the signal is not usable. The same effect is ordinarily found with radio signals, which have a high attenuation factor due to absorption by the ground. Experiments have also been made in which the pipe acts as a wave guide for radio frequencies, but the dispatching of clean-out devices known as "scrapers" or "pigs" make this technique impractical in the majority of cases.

This invention makes possible the use of the pipeline to transmit signals. The pipeline is not used as a wire or conductor as such. The pipeline is employed as the inner conductor of a co-axial cable. The insulating wrapping (provided for corrosion protection) provides the dielectric and the ground surrounding the pipe acts as the other conductor. By employing the pipe and ground as a co-axial cable, attenuation is substantially reduced and useful signals can be transmitted over substantial distances.

For best results the transmitter and receiver should be impedance matched to the line with which they are used through an appropriate network.

The frequency employed and the design of the impedance matching network should be such that optimum conditions will exist for efficient transmission for some distance along the pipe and surrounding earth.

In practicing the method of this invention, the transmission and receiving equipment may be conventional in design and any desired impedance matching network may be utilized. For instance, the radio equipment may be the type used on the lower frequencies (100 to 400 kilocycles). Due to dissipation by leaks in the pipe wrapping, and other reasons, it will usually be necessary to use higher output power than most communications systems.

It is an object of this invention to provide a usable method and system of transmitting signals along a pipeline.

Another object is to provide an inexpensive method of transmitting signals along a pipeline which may be utilized with presently existing lines.

Another object is to provide a signal transmission method and system which utilizes fluid transmission pipes and does not interfere with cathodic protection of the pipeline.

Another object is to provide a method and system of transmitting signals along a fluid transmission pipeline utilizing conventional equipment to both send and receive the signals.

Another object is to provide a signal transmission system and method in which the pipe is used as one wire of a co-axial cable.

Another object is to provide a system of transmitting signals along a pipeline for considerable distance in which the signal may be amplified at spaced points along the line without breaking the line at the amplifying point.

Another object is to provide a method and system of transmitting signals along a pipeline in which a plurality of signals representing different intelligence may be sent.

Another object is to provide a method and system of transmitting signals along a pipeline in which the signal is amplified at spaced apart points and in which additional intelligence may originate at an amplifying point.

Another object is to provide a signal transmission method and system for transmitting a signal along a pipeline in which additional intelligence may be added at spaced points along the line of signals and received at one common terminal point.

Another object is to provide a system for transmitting signals over considerable distances along a pipeline in which an A.C. signal of almost any desired frequency may be sent.

Other objects, features and advantages of this invention will be apparent from the drawings, the specification and the claims.

In the drawings wherein there are shown illustrative embodiments of this invention:

FIGURE 2 is a schematic representation of the use of this invention to send signals over extremely long distances by amplifying the signal at one or more intermediate stations.

Figure 1:
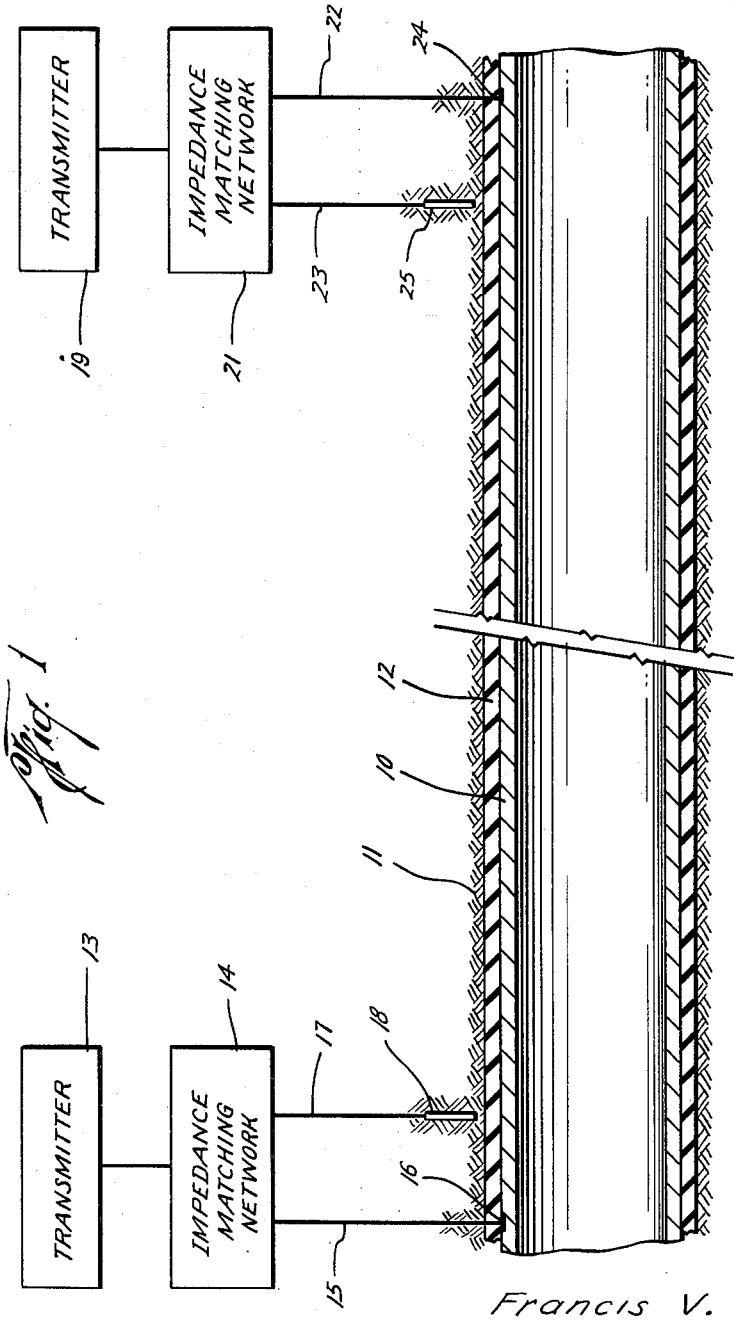
FIGURE 1 is a schematic representation of one form of this invention.

Referring to the drawings and particularly to FIGURE 1, there is shown at 10 a pipeline for conveying fluids such as natural gas, liquid petroleum products, water, etc. Assuming the line 10 to be a gas line, it would extend between compressor stations by which the pressure of the gas is maintained to cause it to flow over tremendous distances.

These compressor stations are in many instances located in remote areas. Intelligence from these stations is presently conveyed to a control center by closed circuit wires, microwave transmission, etc. By this invention this intelligence is transmitted along the pipe. Also where a station is completely mechanized, signals for controlling the compressor station mechanism may also be transmitted along the pipe.

In accordance with this invention, the pipe 10 forms the inner conduit of a co-axial cable. The outer conduit of the co-axial cable is provided by the ground 11 which surrounds the pipe.

The dielectric of the co-axial cable is provided by the insulation 12. The insulation 12 is the conventional pipe wrapping presently employed for cathodic protection.

While there will be some loss in the co-axial cable, particularly at river crossings or other areas in which the pipe is not buried in the ground, this loss is sufficiently low to make signal transmission along this cable practical. It will be appreciated that other mediums which surround the pipe and are insulated from the pipe may furnish the outer conductor. Thus at river crossings the bridge structure will serve as an outer conductor but will not be as efficient as in the case of the buried pipe.

Intelligence is supplied to the pipe by a transmission means which includes a transmitter 13 of conventional design and an impedance matching network 14. This network matches the impedance of the transmitter to the impedance of the co-axial cable provided by the pipe, the wrapping and the ground. The transmitter may be of any desired construction such as, for instance, the equipment usable on the lower frequencies (100 to 400 kilocycles).

The impedance matching network couples the pipe to ground and includes a line 15 which is electrically secured to the pipe at 16 and a line 17 which is electrically secured to a contact plate 18 buried in the ground near the pipe. The impedance matching network may be of any desired design. Preferably the network provides for the inductive coupling of the transmitter to the pipe 10. For instance, this network may be supplied by a coil interconnecting lines 16 and 17 which is inductively coupled to a transmitter coil in the conventional manner. The coils may be provided with a number of taps to permit matching of the impedance of the transmitter to the co-axial cable, or the coils could of course be specially designed to accomplish this purpose. A further illustration of an impedance matching network might include a coil interconnecting the pipe and ground and a variable condenser in the circuit to provide means for matching the impedance of the transmitter with that of the cable. Of course the transmitter would be inductively coupled to such a coil. Examples of these various types of impedance matching networks are shown in FIGURE 2. While inductance coupling is very efficient and therefore preferred, other equivalent coupling such as capacitance coupling might be used.

Due to the low losses of a co-axial cable, the intelligence from transmitter 13 can be conveyed over a considerable distance. The transmission distance will of course be directly related to the output wattage of the transmitter, and the design of the transmitter should be such as to give sufficient power to transmit intelligence for the desired distance.

Intelligence may be taken from the line with any conventional equipment which will receive signals from a co-axial cable. Preferably, a receiving means is provided which includes a conventional type of receiver 19 and an impedance matching network 21. The impedance matching network includes lines 22 and 23 which are electrically connected to the contact point 24 on pipe 10 and contact plate 25 buried in the ground close to the pipe, respectively. The exemplary impedance matching network disclosed for use with the transmitter 13 may also be employed with the receiver 19.

While alternating current of almost any frequency may be used, it is preferred to use a radio frequency signal which is modulated in the conventional manner by an audio signal. However, it has been found that signals in the audio range can be transmitted along the pipe and received with conventional earphones. It is of course apparent that alternating current power may be transmitted from a power source to a remote point along the co-axial cable of this invention to provide energy to operate a radio, supervisory control, telemetering or data handling equipment. Of course power could be transmitted from a control station to a remote location to operate equipment at such location and intelligence from such equipment transmitted back along the pipe and earth to the control center.

Referring to FIGURE 2, this invention is illustrated in more detail and illustrates the manner in which an attenuated signal may be amplified for long-distance transmission. In this case the pipe 26 extends between insulators 27 and 28. Such insulators are frequently found at compressor stations. Where transmission begins at an insulator, it will be appreciated that the full output of the transmitter will be projected in one direction. Where transmission is at a point intermediate insulators, the signal strength will be divided and equal signals transmitted in opposite directions.

The transmission means includes an impedance matching network indicated generally at 28, an F.M. or A.M. transmitter 29 and an audio amplifier 31 for modulating the F.M. or A.M. transmitter. F.M. or A.M. transmitter 29 and audio amplifier 31 may be any conventional construction.

The impedance matching network is provided by an impedance matching coil 32 having a plurality of taps 32a to which the line 33 may be connected to selectively match the impedance of the transmitter system with that of the co-axial cable. The transmitter coil 34 is inductively coupled to the impedance matching coil 32 whereby the R.F. signal from transmitter 29 induces R.F. signals in coil 32.

At a point along the line at which the original signal (frequency $a$) has been considerably attenuated, amplifying means is provided. This amplifying means includes a receiver, means for amplifying the signal and means for retransmitting it along the line. The amplifier includes an impedance matching coil 35 which may be designed to match the impedance of the co-axial cable with the receiver and transmitter. This coil interconnects the contact point 36 on the pipe with the contact plate 37 buried in the ground. The receiving coil 38 is inductively coupled to the impedance matching coil 35 and feeds the signal from the co-axial cable to the receiver 39. The signal is converted to an audio signal and amplified both in the receiver and in the audio amplifier 40. This signal is then fed into audio amplifier 41 and transmitted on frequency $b$ by transmitter 42. Frequency $b$ is selected to be a different frequency than frequency $a$ which is received at the amplifying station. If additional intelligence is to be added to the line at this point, it will be introduced through audio amplifier 41. These audio signals modulate the R.F. signal generated in transmitter 42. This R.F. signal is transmitted to the co-axial cable by a transmitter coil 43 inductively coupled to the impedance matching coil 35. If there is no insulator at this point in the line, the signal from transmitter 42 flows in both directions along the co-axial cable and, therefore, only half the output wattage is usefully employed. It is of course apparent that the full wattage output would be usefully employed by installing an insulator at the amplifying point along the line and receiving signals on one side of the insulator and transmitting them to the other side of the insulator.

The amplifying signal is received at the control center by the receiving means which includes the impedance matching network indicated generally at 44, the receiver 45 and the audio amplifier 46. The impedance matching network 44 illustrates the use of a coil 47 in combination with a variable condenser 48 to selectively match the impedance of the receiver with the impedance of the co-axial cable.

The use of the pipe and surrounding earth as an alternating current transmission means will not interfere with the normal direct current cathodic protection of the pipeline. Where such protection is employed, the connections between D.C. source and pipe, and between the pipe and ground may be through a choke coil indicated generally at 49 which will pass the D.C. current while blocking A.C. current.

From the above, it will be appreciated that all of the objects of this invention have been attained. Any buried insulated pipe, either underground or underwater, may be utilized as a co-axial cable to transmit signals. Therefore where reference is made herein to a buried pipe or to a pipe buried underground, these phrases are intended to include buried underground, underwater, or under the bed of a body of water. For efficient operation, the transmitter and receiver should be impedance matched to the co-axial cable. It will be appreciated, however, that the degree of matching will control the efficiency of the system and some mismatching with resultant loss in efficiency can be tolerated.

The use of the amplifying step illustrated in FIGURE 2 versus the use of higher original transmitter output wattage will be controlled by the economics of the particular installation. The amplifier will be preferred where it is desired to transmit additional intelligence from the amplifying station.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A communications system comprising, an insulated fluid transmission conductive pipe line buried in the ground, A.C. signal transmission means including an impedance matching network electrically connecting the pipe and ground and coupling the transmission means to the pipe and ground, and signal receiving means including an impedance matching network electrically connecting the pipe and ground and coupling the receiving means to the pipe and ground at a point remote from the transmission means.

2. A communications system comprising, an insulated fluid transmission conductive pipe line buried in the ground; A.C. signal transmission means including an impedance matching network electrically connecting the pipe and ground and coupling the transmission means to the pipe and ground; said impedance matching network matching the impedance of the transmission means to the impedance of the pipe, insulation and ground; and signal receiving means including an impedance matching network electrically connecting the pipe and ground and coupling the receiving means to the pipe and ground at a point remote from the transmission means; said last-mentioned network matching the impedance of the receiving means to the impedance of the pipe, insulation and ground.

3. A long-distance communications system comprising; an insulated fluid transmission conductive pipe line buried in the ground; first A.C. signal transmission means including an impedance matching network electrically connecting the pipe and ground and coupling the transmission means to the pipe and ground; said impedance matching network matching the impedance of the transmission means to the impedance of the pipe, insulation and ground; signal receiving means including an impedance matching network electrically connecting the pipe and ground and coupling the receiving means to the pipe and ground at a point remote from the transmission means; said last-mentioned network matching the impedance of the receiving means to the impedance of the pipe, insulation and ground; means for amplifying the signal received and feeding it to a second A.C. transmission means; said second transmission means including an impedance matching network coupling the transmission means to the pipe and ground; said last-mentioned network matching the impedance of the transmission means to the impedance of the pipe, insulation and ground, and a second signal receiving means including an impedance matching network electrically connecting the pipe and ground and coupling the second receiving means to the pipe and ground at a point remote from both transmission means; said last-mentioned network matching the impedance of the receiving means to the impedance of the pipe, insulation and ground.

4. A long-distance communications system comprising, an insulated fluid transmission conductive pipe line buried underground, means electrically connecting the pipe and ground at spaced points to provide a co-axial cable, A.C. first signal transmission means, an inductance coupling between the signal transmission means and the co-axial cable, first signal receiving means, an inductance coupling between the receiving means and the co-axial cable, means for amplifying the signal received and feeding it to a A.C. second signal transmission means, an inductance coupling between the second signal transmission means and the co-axial cable, a second receiving means, and an inductance coupling means between the second receiving means and the co-axial cable.

5. A signal transmission system comprising, an insulated fluid transmission conductive pipe line buried in the ground, means electrically connecting the pipe and ground at spaced points to provide a co-axial cable, A.C. signal transmission means, and an inductance coupling means between the signal transmission means and the pipe and ground.

6. A signal transmission system comprising, an insulated fluid transmission conductive pipe line buried in the ground, means electrically connecting the pipe and ground at spaced points to provide a co-axial cable, A.C. signal transmission means, and an impedance matching network coupling the transmission means to the pipe and ground, said impedance matching network matching the impedance of the transmission means to the impedance of the pipe, insulation and ground.

7. A communications system comprising; an insulated fluid transmission conductive pipe line buried in the ground; means electrically connecting the pipe and ground; A.C. signal transmission means including an impedance matching network coupling the transmission means to the pipe and ground; said impedance matching network matching the impedance of the transmission means to the impedance of the pipe, insulation and ground; and means for receiving said signal from the pipe at a remote point.

8. The method of transmitting signals along an insulated fluid transmission conductive pipe line buried in the ground comprising, transmitting an A.C. signal along the pipe and simultaneously transmitting the same signal along the ground immediately surrounding the pipe whereby the pipe, insulation, and ground will function as a co-axial cable.

9. A communications system comprising, an insulated fluid transmission conductive pipe line buried in the ground, means electrically connecting the pipe and ground at spaced apart points to provide thereby a co-axial cable, A.C. signal transmission means, means coupling the signal transmission means to the co-axial cable, a signal receiving means, and means coupling the signal receiving means to the co-axial cable at a point spaced from the transmission means.

References Cited in the file of this patent

UNITED STATES PATENTS

| | | |
|---|---|---|
| 1,175,082 | Reineke | Mar. 14, 1916 |
| 1,470,430 | Ellison | Oct. 9, 1923 |
| 2,145,153 | Christiansen | Jan. 24, 1939 |
| 2,201,472 | Browder | May 21, 1940 |
| 2,470,000 | Bell | May 10, 1949 |
| 2,740,095 | Somes | Mar. 27, 1956 |
| 2,757,738 | Ritchey | Aug. 7, 1956 |

OTHER REFERENCES

Hitchcock: "Carrier-Current Communication on Submarine Cables," Journal of Amer. Inst. of Elect. Eng. 45: 923–929, October 1926, Bell Syst. Tech. Jour. V: 636–651, October 1926.